Figure 1:
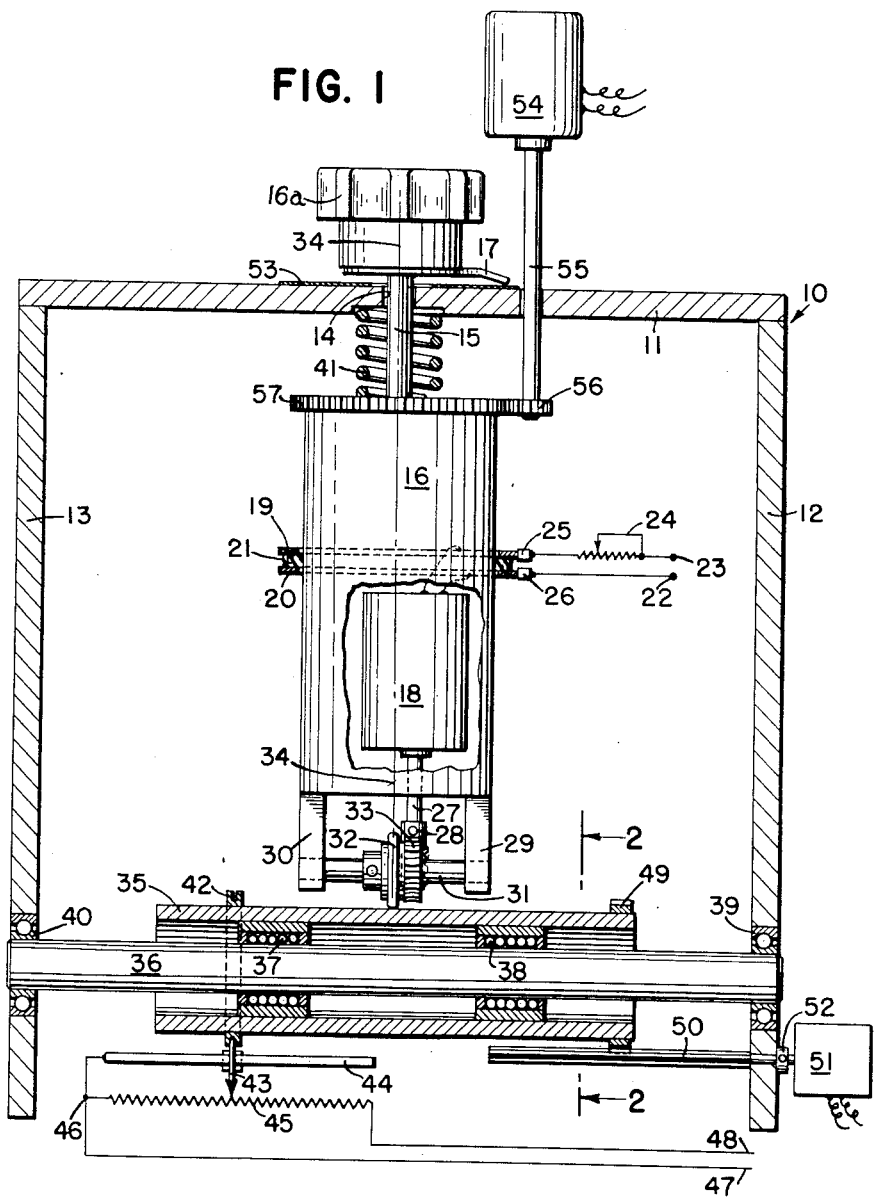

Jan. 5, 1954

F. W. BROWN 2,664,754

MOVING TARGET GENERATING DEVICE

Filed April 19, 1952

2 Sheets-Sheet 1

FIG. I

INVENTOR.

Forrest W. Brown

Jan. 5, 1954          F. W. BROWN          2,664,754

MOVING TARGET GENERATING DEVICE

Filed April 19, 1952          2 Sheets—Sheet 2

INVENTOR.
Forrest W. Brown

Patented Jan. 5, 1954

2,664,754

UNITED STATES PATENT OFFICE 2,664,754

MOVING TARGET GENERATING DEVICE

Forrest W. Brown, Darien, Conn., assignor to The Reflectone Corporation, a corporation of Connecticut Application April 19, 1952, Serial No. 283,203

5 Claims. (Cl. 74—1)

This invention relates to mechanical analog computing devices and synthetic target stimulating equipment and has particular reference to target course generators which generate and simulate the motion of a two dimensional target such as the motion of an aircraft or of a ship.

The motion of an aircraft, ship or other movable object is identified by the characteristics of speed and course. Generally, these characteristics can be represented by a vector, the length of which represents the speed, and the orientation of which with respect to a rectilinear coordinate system, represents the course of the moving target. Often it is desired to gradually alter the course of the target in which case a rate of turn motion must be impressed upon the course characteristics. In its mechanical embodiment such a target generator usually comprises driving means which drive a rotating driving element whose speed is adusted to be proportional to the speed vector $ds/dt$. This circular input motion is then resolved into two mutually normal vectors representing the sine and cosine functions of the input.

The prior art discloses several methods by which circular input motion may be resolved into two mutually normal component vectors. One of the machines presently employed requires the use of mechanical integrators and the application of the well known "Scotch yoke" mechanism in order to align the angular speed relationship between the two rectilinear output vectors. This machine is rather cumbersome and requires a large amount of space. The gear meshes involved cause backlash and contribute to low efficiency as far as power requirement is concerned.

A different type of machine makes use of the ball-type resolver in which a ball is driven by an input roller bearing against a pole and the pressure of this driving roller is balanced by the reaction of a guide roller at the opposite pole. Two output rollers are arranged 90 degrees spaced apart around the equator of the ball whereby the rotation of one output roller represents the sine function of the input and the rotation of the other roller represents the cosine function of the input. This particular construction requires the ball as an intermediate resolving element being interposed between input and output rollers. Moreover, the ball must be balanced by a plurality of accurately aligned guide rollers. Aside from inaccuracies caused by the slip of multiple rolling surfaces and multiple moments of force, this particular resolver is afflicted with inherent inaccuracies when the moving target follows a course which is a small amount off the cardinal points of the compass, in other words, when one of the two resultant outputs is almost but not quite zero.

One of the objects of this invention is to provide an improved target course generating device which avoids one or more of the disadvantages and limitations of prior art arrangements.

Another object of this invention is to provide a simplified arrangement which eliminates the use of an intermediate resolving element interposed between input and output elements.

A still further object of this invention is to provide a target generator which has high accuracy when the course setting is near the cardinal points of the compass.

A still further object of the invention is to reduce the number of elements required for generating a moving target thereby providing a generator of light weight and small size.

In general, the invention provides a moving target generating device in which a drive element circularly rotating at a speed proportional to the speed of the target is positionable about an orientation axis situated normal to the axis of its circular rotation. A cylindrical resolving element having a longitudinal axis substantially parallel to the plane containing the axis of circular rotation of said drive element is mounted for rotation about and translation along said longitudinal axis. The drive element engages said resolving element on the orientation axis. Means connected to said resolving element indicate the mutually normal vector motions imparted upon the resolving element by said drive element.

Figure 2:
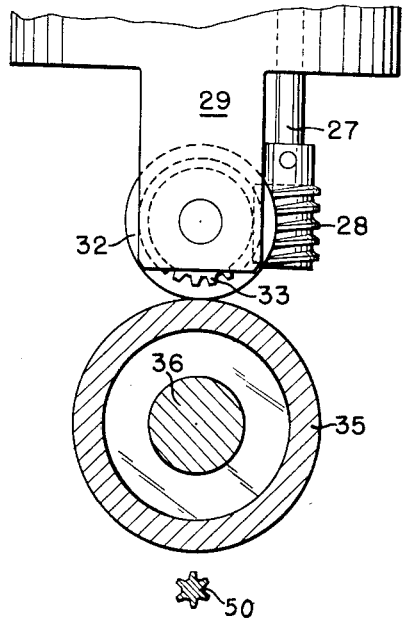
Figure 3:
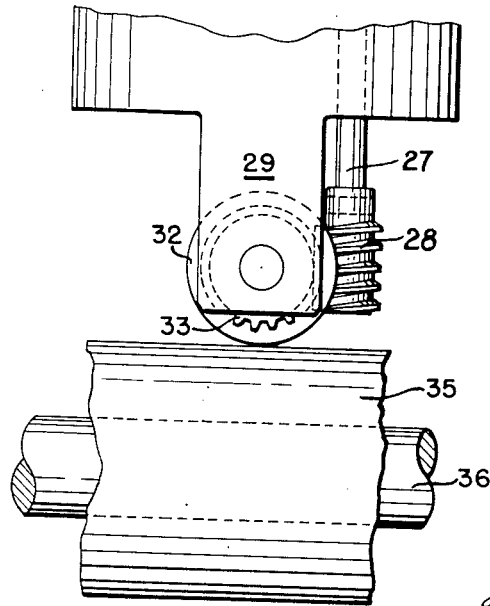

For a better understanding of the present invention, together with other and further objects thereof reference is made to the following description taken in connection with the accompanying drawings in which:

Figure 1 is a semi-schematic vertical view, partly in section, of the apparatus for obtaining the desired two dimensional motion, Figure 2 is an enlarged view of the driving mechanism taken at the plane 2—2 of Figure 1, Figure 3 is an enlarged view of the driving mechanism with the driving wheel rotated 90 degrees from the position shown in Figures 1 and 2.

Referring to Figures 1 to 3 inclusive, numeral 10 in general denotes a three-sided frame comprising a center section 11 and two opposed leg sections 12 and 13 respectively, fastened to the center section 11. Through aperture 14 of center section 11 there protrudes a round shaft 15 connected to a housing 16 and terminating at its upper end in a knob 16a with indicator 17 attached thereon. Within housing 16 there is mounted a motor 18 which may be energized from an external voltage supply connected across terminals 22 and 23 via series connected rheostat 24, sliding contact brushes 25 and 26, and slip rings 19 and 20. Slip rings 19 and 20 are supported by and insulated from housing 16 by an annularly shaped insulating ring 21 mounted on housing 16 in a manner as is well known in the art. Shaft 27 extending from motor 18 and protruding through the lower end of housing 16 is equipped with a worm 28 pinned thereon. Two brackets 29 and 30 respectively, extending from the lower end of housing 16 rotatably support a transverse shaft 31 carrying a driving wheel 32 and a worm gear 33. Driving wheel 32 pinned to shaft 31 is driven from motor 18 by virtue of motor shaft 27, worm 28, worm gear 33 meshed with worm 28 and also pinned to shaft 31.

Driving wheel 32 together with housing 16 may be positioned in clockwise or counter-clockwise rotation about vertical axis 34, hereinafter referred to as orientation axis. In order to achieve the required accuracy of the generating device it is important that the centers of rotation of knob 16a and of driving wheel 32 respectively, are precisely aligned on the orientation axis 34.

Driving wheel 32 is in rolling contact with tubular roller 35 which is journaled on shaft 36 by means of two linear motion ball bushings 37 and 38 respectively. These ball bushings permit roller 35 to translate in axial direction but prevent rotary motion. If desired, roller 35 may be keyed on shaft 36 in such a manner as to permit longitudinal motion but preventing rotary motion of the roller. Rotary motion imparted upon roller 35 and transferred upon shaft 36 is relieved by means of two ball bearings 39 and 40 respectively, which journal shaft 36 in the leg sections 12 and 13 respectively, of the three-sided frame 10. The contact pressure between driving wheel 32 and roller 35 is assured by means of a helical compression spring 41 disposed between housing 16 and center section 11.

Axial motion of roller 35 is translated into electrical signals by the combination of annularly bifurcated retaining ring 42 which is mounted upon roller 35 so as to drive sliding contact 43 axially along circuit bar 44 and resistor 45. Inasmuch as circuit bar 44 and resistor 45 are joined at junction point 46, any movement of sliding contact 43 toward the junction point 46 will appear as an increase of the resistance of resistor 45 measured at terminals 47 and 48 respectively, while any movement away from junction point 46 will appear as a decrease of the resistance.

In a similar manner rotary motion of roller 35 is translated into electrical signals by means of gear 49 mounted upon roller 35 and engaging pinion wire 50 which is journaled in leg section 12 and connects through retaining ring 52 to the shaft of a single or multi-turn potentiometer 51. A dial 53 mounted on the top side of the center section 11 is calibrated in degrees of rotation to indicate the course setting of driving wheel 32, or of knob 16a with pointer 17 respectively. It is obvious that the dial must be positioned in such a manner that when there is but a single motion of roller 35, i. e., either translation along the longitudinal axis of roller 35 or rotary motion thereabout, the pointer 17 points toward one of the cardinal points of the compass.

Driving wheel 32 is positioned manually about axis 34, which is the orientation axis, by turning of knob 16a, or if desired, a gradual turning is achieved by means of the combination of motor 54, shaft 55, gear 56 meshing with spur gear 57 mounted upon the housing 16. The rotor of motor 54 is of sufficient mechanical inertia to act as a brake for the rotation of housing 16. If necessary, the orientation of housing 16 and consequently, the orientation of driving wheel 32, may be stabilized by an additional friction brake acting upon the housing 16, such as is well known in the art.

In Figure 1 the driving wheel 32 is shown oriented in such a way that roller 35 is driven in one direction only, namely, in rotary motion. This setting corresponds to a course on one of the cardinal points of the compass. In Figure 3 the course setting of driving wheel 32 is shown rotated by 90 degrees resulting in longitudinal motion only of the roller 35. It is obvious that for any course setting between two cardinal points roller 35 has two component motions, namely, translating motion along the longitudinal axis and rotary motion about this longitudinal axis.

In operation, the driving wheel 32 is positioned to the course setting desired by means of manual rotation of knob 16a or by energization of motor 54. Then voltage is applied to terminals 22 and 23 to start the driving motor 18. The motor speed is adjusted by means of rheostat 24 so that driving wheel 32 rotates at a speed proportional to the speed of the moving target. The circular motion of driving wheel 32, representing the course vector of the moving target, is imparted upon roller 35 causing a peripheral displacement. This roller, constituting the resolving element, resolves the circular input motion into two mutually normal vectors of course representing the sine and cosine function of the input vector, namely, translating motion along the longitudinal axis and rotary motion about the longitudinal axis of roller 35. Where it is desired that the target execute a turn, motor 54 can be energized and its speed adjusted in such a manner that the shaft rotation thereof biases the course setting at the proper rate of turn, usually expressed in degrees per second.

In order to achieve high accuracy it is necessary that the driving wheel 32 engages roller 35 on the orientation axis 34. If this is not the case, the driving wheel 32, when changing the course, will circumscribe a small circle thereby changing its relative position with respect to roller 35.

From the above description it will be evident that the invention provides a simple means for generating a moving target involving the conversion of circular input motion into two mutually normal vectors of course.

While there has been described and illustrated a specific embodiment of the invention, it will be obvious that various changes and modifications may be made therein without departing from the field of the invention which should be limited only by the scope of the appended claims.

What is claimed is:

1. A moving target generating device comprising a drive element circularly rotating at a speed proportional to the speed vector of the target, said drive element positionable about an orientation axis situated normal to the axis of its circular rotation, a cylindrical resolving element having a longitudinal axis substantially normal to said orientation axis mounted for rotation about and translation along said longitudinal axis, said drive element engaging said resolving element on said orientation axis and voltage divider means connected to said resolving element for indicating the mutually normal vector motions imparted upon said resolving element by said drive element.

2. A moving target generating device comprising a drive element circularly rotating at a peripheral speed proportional to the speed of the target, said drive element pivotally mounted about an orientation axis situated normal to the axis of its circular rotation, a cylindrical resolving element having a longitudinal axis substantially normal to said orientation axis mounted for rotation about and translation along said longitudinal axis, said drive element frictionally engaging said resolving element on said orientation axis, a set of indicating means connected to said resolving element for indicating the longitudinal and rotary motion imparted by said drive element upon said resolving element.

3. A moving target generating device comprising a variable speed drive, a driving wheel circularly rotating at a peripheral speed proportional to the speed of the target connected to said variable speed drive, said driving wheel pivotally mounted for continuously clockwise or counter-clockwise positioning about an orientation axis situated normal to the axis of its circular rotation, a cylindrical resolving element having a longitudinal axis substantially normal to said orientation axis mounted for rotation about and translation along said longitudinal axis, said driving wheel rollingly contacting said resolving element on said orientation axis thereby causing said resolving element to become displaced, a plurality of electro-mechanical indicating means connected to said resolving element for indicating the rectilinear displacements imparted upon said resolving element.

4. A moving target generating device comprising a variable speed drive, a driving wheel circularly rotating at a peripheral speed proportional to the speed of the target connected to said variable speed drive, said driving wheel pivotally mounted for continuously clockwise or counter-clockwise positioning about an orientation axis situated normal to the axis of its circular rotation, a cylindrical resolving element having a longitudinal axis substantially normal to said orientation axis mounted for rotation about and translation along said longitudinal axis, said driving wheel rollingly contacting said resolving element on said orientation axis thereby causing said resolving element to become displaced, a pair of indicating means connected to said resolving element, each of said means indicating one of the two rectilinear displacements imparted upon said resolving element, and means to position said driving wheel about said orientation axis.

5. A moving target generating device comprising a three-sided frame, said frame having a center section and two opposing leg sections attached to said center section, a housing supported by said center section and positionable about an orientation axis situated substantially normal to the longitudinal axis of said center section, variable drive means mounted within said housing and adapted to be positioned about said orientation axis in unison with said housing, a driving wheel supported by said housing, means connecting said variable drive means with said driving wheel causing said wheel to rotate with a peripheral speed proportional to the speed vector of the target, said driving wheel rotating about an axis substantially normal to said orientation axis, a shaft having a longitudinal axis substantially normal to said orientation axis traversing the open end of said three-sided frame, said shaft being journaled in the opposing leg sections for rotary motion about its longitudinal axis, a tubular roller of shorter length than said shaft mounted substantially concentric upon said shaft, said roller journaled on said shaft for translation along said longitudinal axis, said driving wheel and said roller rollingly engaging one another on said orientation axis thereby causing the peripheral surface of said roller to become displaced, indicating means connected to said roller adapted to indicate the two mutually normal component vectors of the speed vector being apparent as the longitudinal and rotary displacements of said roller and means to influence the position of said driving wheel about said orientation axis.

FORREST W. BROWN.

References Cited in the file of this patent
UNITED STATES PATENTS

| Number | Name | Date |
| --- | --- | --- |
| 679,569 | McCartney | July 30, 1901 |
| 1,448,490 | Moakley | Mar. 13, 1923 |
| 2,382,105 | Sarver | Aug. 14, 1945 |
| 2,477,527 | Pierce | July 26, 1949 |

FOREIGN PATENTS

| Number | Country | Date |
| --- | --- | --- |
| 965,091 | France | Sept. 1, 1950 |